United States Patent [19]

Kurihara et al.

[11] 3,713,371
[45] Jan. 30, 1973

[54] AUTOMATIC FOCUSING CAMERA

[75] Inventors: Makoto Kurihara; Hideaki Akiyama, both of Tokyo, Japan

[73] Assignee: Ricoh Co., Ltd., Tokyo, Japan

[22] Filed: Feb. 9, 1971

[21] Appl. No.: 113,859

[30] Foreign Application Priority Data

Feb. 14, 1970 Japan..............................45/12937

[52] U.S. Cl....................95/44 C, 95/45, 250/209
[51] Int. Cl..........................................G03b 3/02
[58] Field of Search........95/44 C, 44 R, 45; 250/209

[56] References Cited

UNITED STATES PATENTS

| | | | |
|---|---|---|---|
| 3,274,914 | 9/1966 | Biedermann et al | 250/209 X |
| 3,274,913 | 9/1966 | Biedermann et al | 95/44 C |
| 2,922,351 | 1/1960 | Hering | 95/45 |
| 3,367,254 | 2/1968 | Townsley | 250/209 X |
| 3,532,045 | 10/1970 | Genähr | 95/45 |

Primary Examiner—Samuel S. Matthews
Assistant Examiner—E. M. Bero
Attorney—Henry T. Burke, Robert Scobey, Robert S. Dunham, P. E. Henninger, Lester W. Clark, Gerald W. Griffin, Thomas F. Moran, Bradlee Boal and Christopher C. Dunham

[57] ABSTRACT

A mechanical automatic focusing system for cameras which may be energized by, for example, the film winding operation is provided for shifting a camera lens from its infinity focus position to any intermediate proper focus position as far as the closest focus position or vice versa upon release of a shutter release button. A signal from a photoelectrically-powered spatial frequency sensing device, properly positions a locking means to temporarily lock the camera lens at a focusing position as it shifts from an extreme position so that it may focus the sharp image of a subject for a time interval during which a shutter is released. In size and weight the automatic focusing camera may be comparable to the conventional electronic shutter camera because no electric motor is used for shifting the camera lens. In addition, no direction signal is required for determining whether the camera lens should be shifted forward or backward to focusing position since the lens is always shifted from the same extreme start position to the proper focused position.

2 Claims, 4 Drawing Figures

AUTOMATIC FOCUSING CAMERA

BACKGROUND OF THE INVENTION

The present invention relates to an automatic focusing camera of the type having a mechanism for shifting a camera lens, which mechanism is suitable for use in combination with a spatial frequency sensing device which generates a signal indicating only when the maximum resolving power is obtained in automatic focusing, that is only when the camera lens focuses a sharp image.

Spatial frequency sensing devices may be used in automatic focusing with a high degree of accuracy to determine whether a subject to be photographed is sharply focused or not. However, such detectors have a distinctive drawback in that they cannot produce a directional signal for determining whether the camera lens should be shifted forward or backward so as to focus a sharp image since the signal which they generate only indicates when the camera lens focuses a sharp image. It is thus necessary to provide additional means for focusing whereby the camera lens is not automatically shifted or moved to position portion where it may sharply focus a desired subject on a film plane.

In addition, in the case of an automatic focusing camera of the type using an electric motor for shifting its camera lens, the dimensions of the camera will become large and a high power battery which is generally bulky in size will be required for energizing the motor. This makes the camera more bulky in size.

SUMMARY OF THE INVENTION

The primary object of the present invention is to provide an automatic focusing camera with the ability to automatically shift its camera lens to a position where it may focus a sharp image.

Another object of the present invention is to provide an automatic focusing camera of the type described which can automatically shift its camera lens without use of an electric motor.

Another object of the present invention is to provide an automatic focusing camera of the type described which is compact in size and light in weight so that the overall dimensions and weight of the camera of the present invention may be comparable with the conventional electronic shutter camera.

Another object of the present invention is to provide an automatic focusing camera of the type described capable of fully-automatic focusing on a subject with a high degree of accuracy.

In brief, the present invention provides an automatic focusing camera which includes a first means for shifting a camera lens from a rest extreme focus position and a second means for stopping said first means and hence the movement of the camera lens at a position where it focuses a sharp image. The first means is, for example, mechanically coupled to a suitable mechanism in a camera such as a film winding mechanism so that it may be charged with sufficient energy to shift the camera lens from a rest position such as the infinity focus position to an opposite limit position such as the closest focus position. The term "infinity focus position" is used in this specification to denote a position where the camera lens will focus a subject at infinity and the term "closest focus position" denotes the position where the camera lens will focus a subject spaced apart from the camera lens at the least distance from the lens that the subject can be sharply focused. The second means includes a stop means which is actuated in response to a signal generated by a spatial frequency sensing device when the subject is sharply focused so that the first means and hence the camera lens is stopped at a position where the subject is sharply focused when a shutter is released.

The present invention will become more apparent from the following description of the preferred embodiment thereof taken in conjunction with the accompanying drawing.

DESCRIPTION OF THE PREFERRED EMBODIMENT

Figure 2:
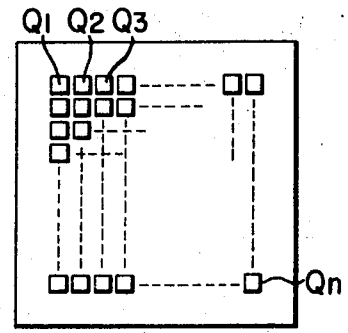
Figure 3:
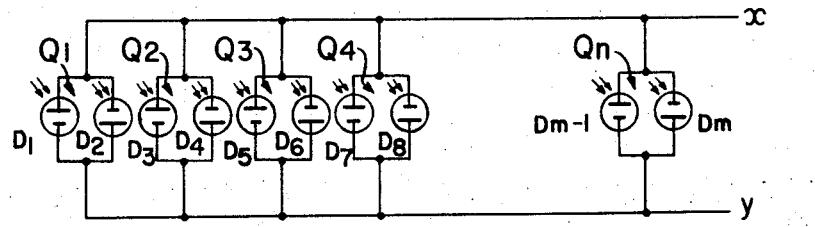

First referring to FIGS. 1-3, a spatial frequency sensing device for use in an automatic focusing camera in accordance with the present invention will be described. The present device which will be called a spatial frequency detector is used for sensing whether a camera lens is sharply focusing an image or not. It operates on the principle that the difference between a focused image and a blurred image can be determined by the abruptness of the change in the brightness between adjacent elements of the image. A focused image will have sharp changes in brightness or brightness discontinuities among its elements while a blurred image tends to have a more continuous brightness level throughout its elements. If the image of a striped pattern is considered, it will be seen that the discernible space or pitch between the stripes increases with improved focusing and decreases or fades into a continuous field with defocusing. The reciprocal of the discernible pitch is called spatial frequency.

Figure 1:
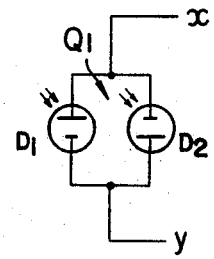
FIGS. 1-3 are views for illustrating spatial frequency sensing device for use in an automatic focusing camera in accordance with the present invention.

A sensing element $Q_1$ used in constructing the spatial frequency detector of the present invention is shown in FIG. 1 and fundamentally comprises a pair of photoelectric effect elements such as p-n silicon solar cells $D_1$ and $D_2$ connected in parallel and in opposite polar orientation across a pair of output leads $X$ and $y$. The dimensions of the sensing element $Q$ will be of the order of a picture element to be focused, that is of the order of 0.02-0.002 mm X 0.02 - 0.002 mm. When a subject is sharply focused, as previously explained the discontinuity or degree of contrast in the brightness adjacent picture elements will become more pronounced in any arbitrarily chosen row or column of picture elements, but when the subject is not focused, the degree of contrast is less pronounced and the brightness level will become almost continuous. It should also be noted that these phenomena are best observed when monochromatic light is used. The spatial frequency detector is constructed as shown in FIG. 2, wherein a large number of sensing elements $Q_1, Q_2 \ldots Q_n$ all of which are identical in construction to $Q_1$ are arrayed in rows and columns in such a way that each sensing element corresponds to each picture element. All of these sensing elements $Q_1$-$Q_n$ are connected in parallel across the pair of output leads $x$ and $y$ as shown in FIG. 3 from a battery. Now consider that the sensing element $Q_1$ experiences light impinging upon the silicon solar cell $D_1$ which is stronger in intensity than that of light falling upon the solar cell $D_2$. A positive potential having an energy corresponding to the difference between the energies of light impinging upon the two cells $D_1$ and $D_2$ appears on the $X$-output lead with respect to the $y$-lead. It is, of course, understood that the connection of the solar cells $D_1$ and $D_2$ is reversed a negative potential appears on the output lead $x$ with respect to the $y$-lead. When the magnitudes of the light intensities impinging upon the solar cells $D_1$ and $D_2$ are equal, that is when the spatial frequency is relatively low, the output voltage across leads $x$ and $y$ will be almost zero. The state of the output derived from the sensing element $Q_1$ described above is similar to that in all the other sensing elements $Q_2$-$Q_n$. When the camera lens precisely and sharply focuses an image upon the film plane, positive or negative outputs are derived from each of the sensing elements $Q_1$-$Q_n$. On the other hand, when the camera lens does not focus, there is little or no output. It is, of course, possible to place suitable amplifiers and other circuit elements in the circuit shown in FIG. 3. It is a very important fact that all of these sensing elements and their associated circuits can be produced in the form of an integrated circuit. The present state of the IC techniques may provide a spatial frequency sensing device in the form of an integrated circuit with a high resolving power of higher than 100 lines per inch.

Figure 4:
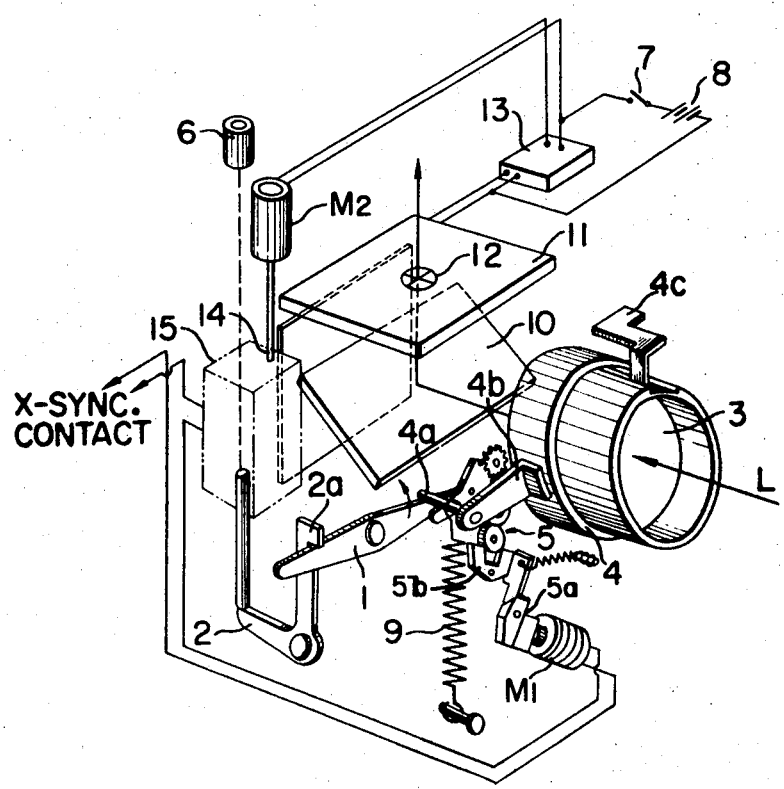
FIG. 4 is a perspective view illustrating the fundamental component parts of the preferred embodiment of the present invention.

Next the mechanical focusing system which operates in cooperation with the spatial frequency detector will be described. Referring to FIG. 4, a lever 1 is shown which may be rotated in the direction indicated by the arrow by means of a film advance mechanism when a film (not shown) is advanced by the operator. Rotation of lever 1 extends a spring 9 through a pin 4a which is fixed to a helicoid ring 4 through a lever 4v. The lever then locked in the position shown in FIG. 4 by a hook 2a of an L-shaped engaging lever 2. In this case, a camera lens 3 is at rest at the closest focused position and is moved to the infinity focus position through a governor 5, the helicoid ring 4 and a helicoid key 4c. An electromagnet $M_1$ which is normally de-energized is adapted to be energized when a built-in switch (not shown) corresponding to an X-xync. contact in a focal plane shutter mechanism 15 is closed so as to attract an armature lever 5a carrying a U-shaped locking member 5b which locks the governor 5.

A switch 7 is closed when a shutter release button 6 is slightly depressed so as to connect a power source 8 to an electric circuit consisting of a spatial frequency detector 12, an amplifier-switching circuit 13, an electromagnet $M_2$ which drives the shutter mechanism 15 and the electromagnet $M_1$. The spatial frequency detector 12 is placed at the center of a ground glass 11 upon which the image is formed by light rays L which pass through the camera lens 3 and are split and redirected by a half mirror 10.

When the shutter release button 6 is further depressed, the lever 1 is disengaged from the engaging lever 2 so that the spring 9 is now released. As a consequence, the camera lens 3 starts to shift, being governed with the governor 5, from the infinity focus position to the closest focus position under the force of spring 9, through the helicoid ring 4 and the helicoid key 4c thereon. The spatial frequency detector 12 is already energized. When the camera lens 3 focuses the sharp image of the subject upon the camera film plane (not shown), a signal is generated by the spatial frequency detector as described hereinabove and is applied to the amplifier-switching circuit 13 so that both of the electromagnets $M_1$ and $M_2$ are simultaneously energized. As a consequence a shutter release lever 14 is actuated to actuate the focal plane shutter mechanism 15 and the armature lever 5a is attracted toward the pole face of the electromagnet $M_1$ so as to engage the U-shaped locking member 5b with the governor 5. Thus the camera lens 3 is locked in at the best focus position temporarily at least until the shutter mechanism 15 is closed again. Thereafter, the electromagnet $M_1$ is de-energized again so that the U-shaped locking member 5b is disengaged from the governor 5, whereby the camera lens 3 may be shifted again toward rest at the closest focus position under the force of spring 9.

From the foregoing description it is seen that no direction signal is required to determine the direction of shift of the camera lens because the camera lens may be automatically stopped at a position where it focuses the sharp image when it is shifted under the mechanical force from the infinity position to the closest focus position or vice versa.

The instant embodiment has been described as being applied to the single-lens reflex camera, but it is understood that the present invention may be also applied to a lens-shutter camera when an additional lens system is provided in addition to a master lens system in such a way that the additional lens system focuses and shifts the master lens system accordingly. It is also understood that the electromagnet $M_1$ may be eliminated when an arrangement is made so as to derive the mechanical force for locking the camera lens in focusing position from the shutter mechanism.

What is claimed is:

1. In an automatic focusing camera of the type comprising:
   a. a camera lens means for focusing the image to be photographed and disposed at rest at one of its extreme focus positions;
   b. a shutter means;
   c. a shutter release means for operating said shutter means; and
   d. a film advance means;

the improvement comprising an automatic focusing device including:
   e. sensing means for sensing and generating a signal when the camera lens means sharply focuses the image, said sensing means comprising:
      1. a plurality of photoelectric effect elements each having a positive and negative pole and closely arranged in columns and rows forming a field for receiving the focused image; and
      2. two output terminals across which all of said photoelectric effect elements are connected in parallel with adjacently positioned elements having like poles, connected to different of said output terminals;

g. spring means loaded in response to the operation of said film advance means so as to possess the mechanical energy to shift said camera lens means;

h. mechanical means operatively coupled to said camera lens means and said spring means for shifting said camera lens means from rest at one of its extreme focus positions to its opposite extreme focus position in response to the operation of said film advance means and for shifting said camera lens means back toward rest under the action of said spring means in response to the operation of said shutter release means; and i. lock means actuated in response to the signal from said sensing means to lock said mechanical means and hence said camera lens means at a position during shifting whereat the image is sharply focused.

2. A device as in claim 1 wherein said lock means comprises:

j. a governor means operatively coupled to said camera lens means;

k. an armature lever pivoted to engage said governor means; and l. an electromagnet which is energized in response to said signal from said sensing means to attract said armature lever thereto pivoting it into engagement with said governor means to lock the shifting of said camera lens means, and which is deenergized in response to the release of said shutter means pivoting said armature lever to unlock said governor means thereby permitting said camera lens means to return to rest at said one extreme focus position.

* * * * *